US006441505B1

(12) United States Patent
Poletti et al.

(10) Patent No.: US 6,441,505 B1
(45) Date of Patent: Aug. 27, 2002

(54) STACKED CABINET BACKUP GENERATOR

(75) Inventors: Mark J. Poletti, Louisville; Dennis Brauch, Arvada; Dave V. Coxen, Longmont, all of CO (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 09/209,872

(22) Filed: Dec. 11, 1998

(Under 37 CFR 1.47)

(51) Int. Cl.$^7$ .................................................. H02J 3/00
(52) U.S. Cl. ........................................ 290/1 A; 123/350
(58) Field of Search ............................. 322/1; 290/1 R, 290/1 A, 1 B, 2; 123/41.43, 331, 339.1, 350

(56) References Cited

U.S. PATENT DOCUMENTS

| | | | | |
|---|---|---|---|---|
| 3,964,458 A | * | 6/1976 | Strauss et al. | 123/122 H |
| 4,702,201 A | * | 10/1987 | Odo et al. | 123/2 |
| 4,831,277 A | * | 5/1989 | Christopher | 290/1 A |
| 5,181,541 A | * | 1/1993 | Bodenheimer | 137/899 |
| 5,212,952 A | * | 5/1993 | Yokoyama et al. | 60/721 |
| 5,581,986 A | * | 12/1996 | Calver | 56/12.7 |
| 5,710,804 A | | 1/1998 | Bhame et al. | 379/58 |
| 5,739,675 A | * | 4/1998 | Green et al. | 322/1 |
| 5,973,481 A | * | 10/1999 | Thompson et al. | 290/2 |
| 5,977,644 A | * | 11/1999 | Smith | 290/1 B |

OTHER PUBLICATIONS

PCS CDMA Minicell (Lucent Technologies, Bell Labs Innovations) Wireless Marketing 4877FS NAK 3/97 4 pgs.
Generac II Pre-Packaged Emergency Power Systems; (Bulletin S61500/Printed in USA/7.96–revised 3/97 8 pgs.

* cited by examiner

Primary Examiner—Nicholas Ponomarenko
(74) Attorney, Agent, or Firm—Marsh Fischmann & Breyfogle LLP

(57) ABSTRACT

A backup generator located at a remote site provides the advantages of being compact in size but providing backup power over a long period of time. A multi-level cabinet which includes room for a backup generator and a fuel tank is located in close proximity to the electronic devices for which the power will be provided. The fuel tank may be used to hold propane or a similar fuel, and the tank will be included in a stacked structure with the backup generator. The cabinet for the generator includes sufficient structure to protect the electronics of the backup generator from the elements. Connected between the backup generator and a primary power source to the electronic devices, such as a personal communications system (PCS) site, is a sensor which detects when a power failure has occurred. In the event that such a failure has occurred, the backup generator is activated and provides power to the site electronics. Other monitoring equipment may be included with the backup generator so that its operation may be monitored from a remote location.

20 Claims, 4 Drawing Sheets

STACKED CABINET BACKUP GENERATOR

FIELD OF THE INVENTION

This invention relates to an automated backup generator and more particularly to a self-contained automated backup generator which may be used outdoors and may provide power for extended periods of time.

BACKGROUND OF THE INVENTION

In recent years, there has been a rapid growth in the telecommunications and wireless communications industry. This rapid growth has meant that networks of wireless telecommunications transceivers sites have been constructed across the U.S. and around the world. This has been particularly true in the cellular phone and personal communications system (PCS) industry where cell/PCS sites are located to provide a network of overlapping service areas. Each cell/PCS site is positioned such that communications service may be offered throughout the service area to be served by network. Typically, a cell/PCS site will have a tall tower for supporting the cellular antennas. In addition, provisions must be made at the cell/PCS site for housing the radio equipment, for interconnecting the cell/PCS site to the telephone or telco network, and for supplying AC power to the cell/PCS site. This has typically required the construction of a shelter at the cell/PCS site to house this equipment and to provide an area where the various services may be connected with one another.

In order to provide the desired coverage, sometimes the cell/PCS sites must be positioned in very remote locations or in locations with significant space limitations, like the tops of buildings. In selecting components to make up a cell/PCS site, some criteria to take into account are space limitations, leased space cost, zoning limitations, and aesthetic values. Even with the aforementioned limitations, there must be enough space at the PCS site to work on all of the equipment.

Once a cell site has been established, a power source is found to provide electricity to the components. In most cases, the stations are powered through an AC line which is run to the site from local power grid. In certain situations, due to storms or other types of failures, external power to the cell/PCS site may be lost. When power is lost, the radio antenna is unable to receive or transmit telephone calls and a zone of coverage for the cellular system may be temporarily disabled. In situations such as these, it may be desirable to have a backup power source.

SUMMARY OF THE INVENTION

Disclosed herein is a self-contained generator which provides power to electronic components. In one aspect of the invention, this generator is employed in the situation where backup power is required when a primary power source has failed. One potential application of this backup generator is to a remotely located personal communications system (PCS) transceiver site.

At the transceiver, or PCS site, there may be a transceiver antenna for receiving and transmitting cellular communications. In connection with the antenna there may be at least one electronics cabinet which may include electronics for processing cellular communications. Data lines connected to the electronics cabinet carry information signals related to the cellular communications. Also connected to the cabinet is a primary power line which provides power from a remote source such as a power grid for a local community. In one aspect of the invention, the PCS site includes a backup generator is electrically connected to the electronics cabinet. The backup generator may be a two level cabinet which contains both the electric generator and a self contained fuel source. The backup generator may be an internal combustion engine added to generate electricity. The fuel source may be a tank of propane or of other flammable liquid or vapor which is appropriate for the type of engine used in the generator.

A sensor switch type device may be connected along the primary power line which runs into the electronics cabinet. This sensor may monitor whether the primary power line is providing electricity to the electronics cabinet. In the situation where a power outage has occurred this will be defected and, the backup generator will be activated and provide power to the electronics cabinet. The self-contained fuel tank is sized such that it may provide fuel to the generator for an extending period of time. Additionally positioning the tank on shelf just below the generator proves to be a very compact design, Once power is restored to the electronics cabinet over the primary power line this is sensed and the backup generator is shut down until another power outage is detected.

Other components may be included in the backup generator system in order to periodically test the generator and monitor its performance. A connection may be established between the backup generator and a remote monitoring site. Through this remote monitoring size, engineers may monitor the operation of the backup generator during outages to determine if indeed it has automatically started, and what its functional status is. An automatic timer may also be included in the backup generator which runs the generator periodically as a maintenance check. Other sensors which monitor the state of the generator system may also be included. One such monitor would be a sensor for the fuel tank. This sensor may be a simple switch which provides an indication when the fuel level drops below a particular point or it may be more sophisticated and provide an accurate reading of the fuel level. Other sensors may monitor the power output and the operating temperature to detect any potential problems.

DETAILED DESCRIPTION

Figure 1:
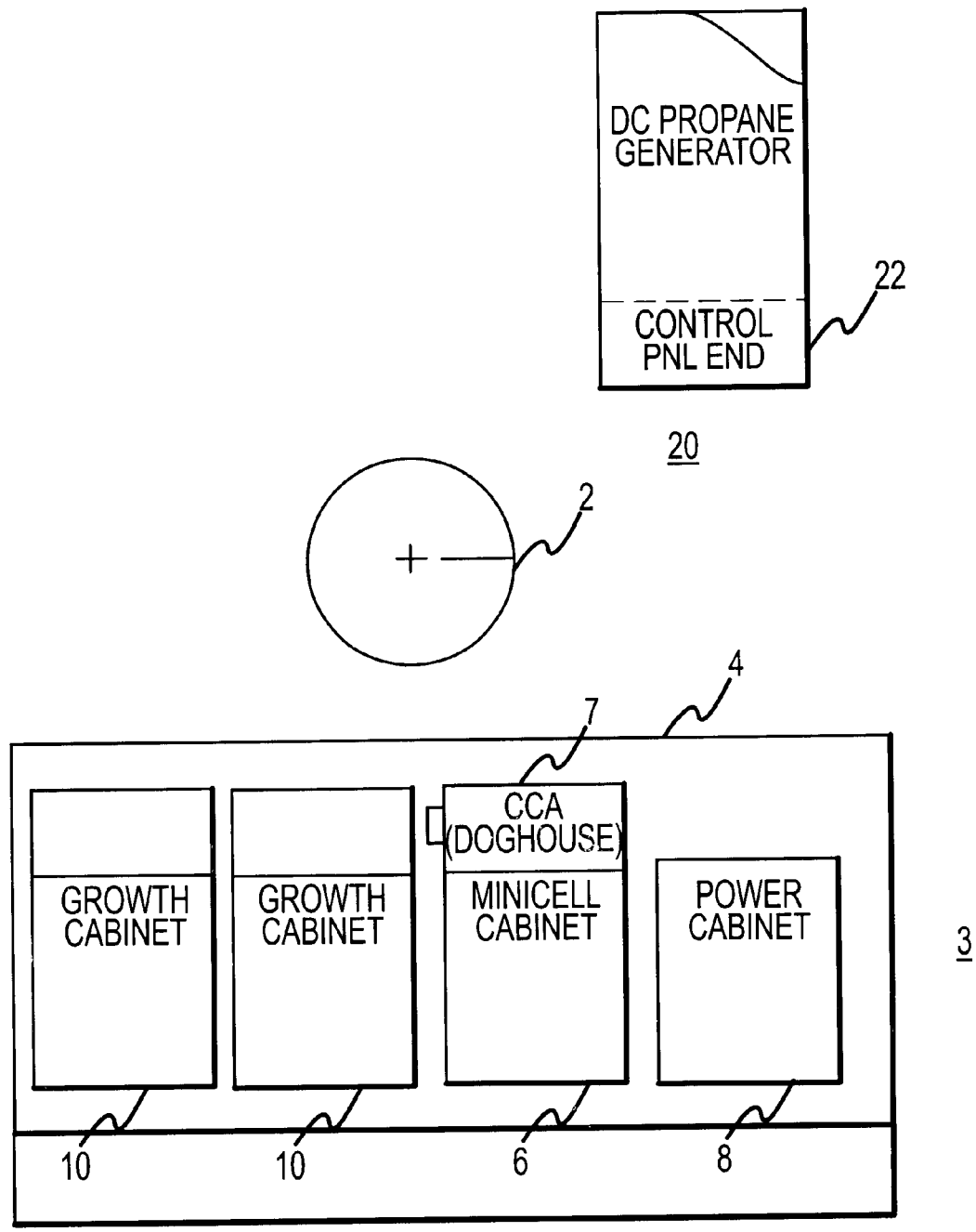
FIG. 1 is a plan view of a personal communications system site including the electronic cabinets for processing various types of communications information, the antenna and the backup generator.

Disclosed in FIG. 1 is a plan view of a personal communication system (PCS) site. In order to provide cellular phone and other communication services to customers, transceiver sites for receiving and transmitting communications signals are spread out through a designated region in order to provide overlapping zones of coverage. Included in the PCS site is an antenna tower 2. In FIG. 1 it is represented as a circle but it may be a lattice type tower which may be of any desired height supporting any of a wide variety of known wireless telecommunications antenna. Proximate to the antenna are the electronics 3 for processing the wireless telecommunications information. In the PCS site described in FIG. 1, a series of cabinets encloses the equipment and these cabinets are mounted upon a platform 4 such as a concrete slab. The cabinets may include a mini cell cabinet 5 which includes the electronics which processes the wireless telecommunications information. Running from the mini cell cabinet are a variety of communication lines which connect the PCS site to the public switched telephone network (PSTN). As part of the mini cell cabinet there may be a circuit card assembly (CCA) enclosure 7 for locating all circuit cards necessary in order to process a telecommunications information. Adjacent to the mini cell cabinet is power cabinet 8 which receives the power necessary to run the PCS site from a remote power source. This power cabinet provides all the conversion functions necessary in order for the mini cell cabinet to use the power. Because of the changing technology and wireless telecommunications, space is also reserved in the station through cabinet 10 for growth.

Also, shown in FIG. 1 is a plan view of the backup electrical generator 20. The backup generator is included as part of the PCS site in case the primary power source to the telecommunications electronics fails. In one aspect of the invention, the telecommunications electronics 3 are connected to the power grid of a community in which the PCS site is located. As is known, power grids, parts of the grid, can go down for a variety of reasons. It is also known that when power grids do go down due to storms or other phenomenons, they may be off line for days at a time. In the event of primary power failure it is desirable that the telecommunications network continues operation. In order for this to happen, an alternate source of power must be provided to the PCS site. In the invention described herein, the backup generator 20 provides this backup power source for these situations where the primary power source goes out for either short or extended periods of time.

Figure 2:
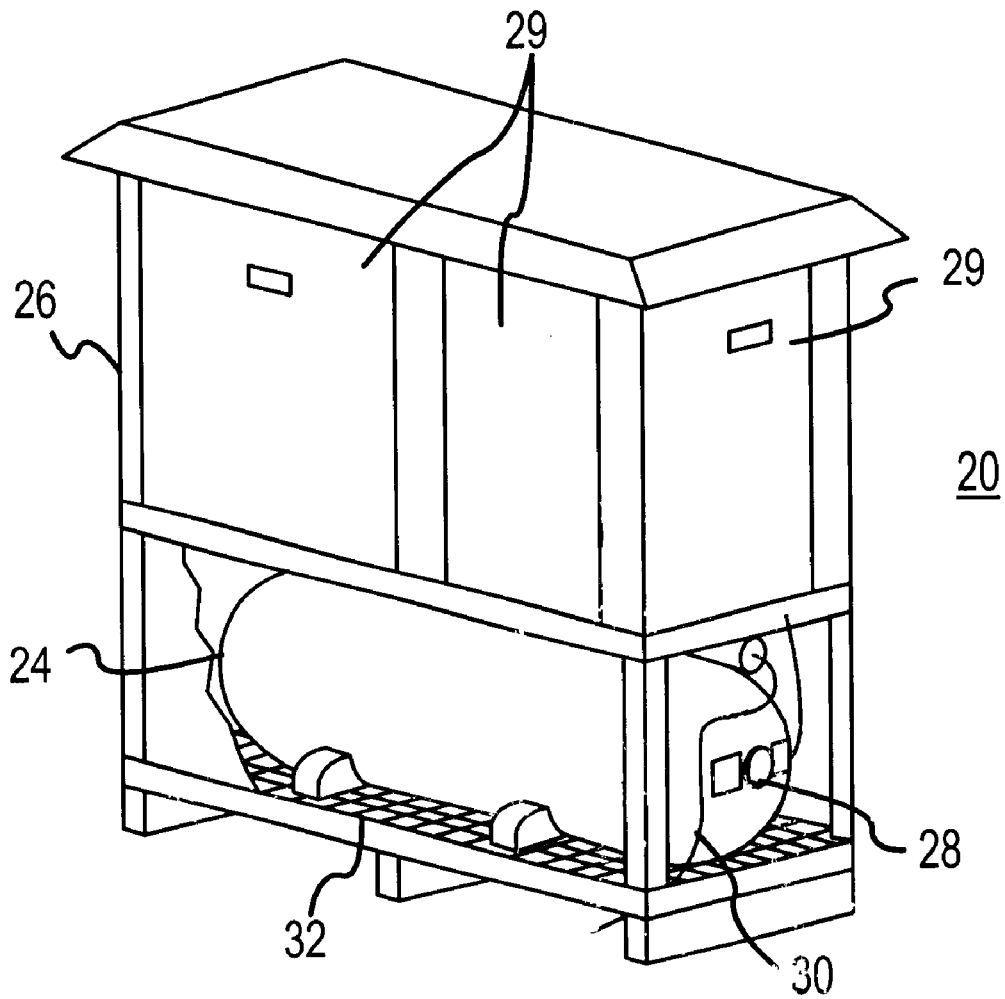
FIG. 2 is a geometric view of the backup generator cabinet including the self contained fuel source.

Disclosed in FIG. 2 is a geometric view of the backup generator System 20 including cabinet 22. In one aspect of the invention, the cabinet has two levels, one for the self contained fuel source 24, and one to hold the generator and associated electronics. This multi-level structure is advantageous in that it conserves space. In one aspect of the invention the self contained fuel source is a propane tank. This propane tank may endure long term exposure to the weather. The only limitation would be in size. The tank would be sized to fit within the cabinet. Included as part of the self contained fuel source, is fuel line 28 which feeds propane from the tank to the backup generator. Also included on the fuel source 24 is sensor 30 which detects when the fuel level within the tank drops below a predetermined level. This detected condition is fed back to a remote monitoring station. The function of the remote monitoring station will be described in more detail below. Environmental covers 29 provide protection for the generator and related electronics from the weather because the PCS stations are located in some very exposed places with respect to the weather. These covers provide sealed environment sufficient to protect the sensitive electronics.

Figure 3:
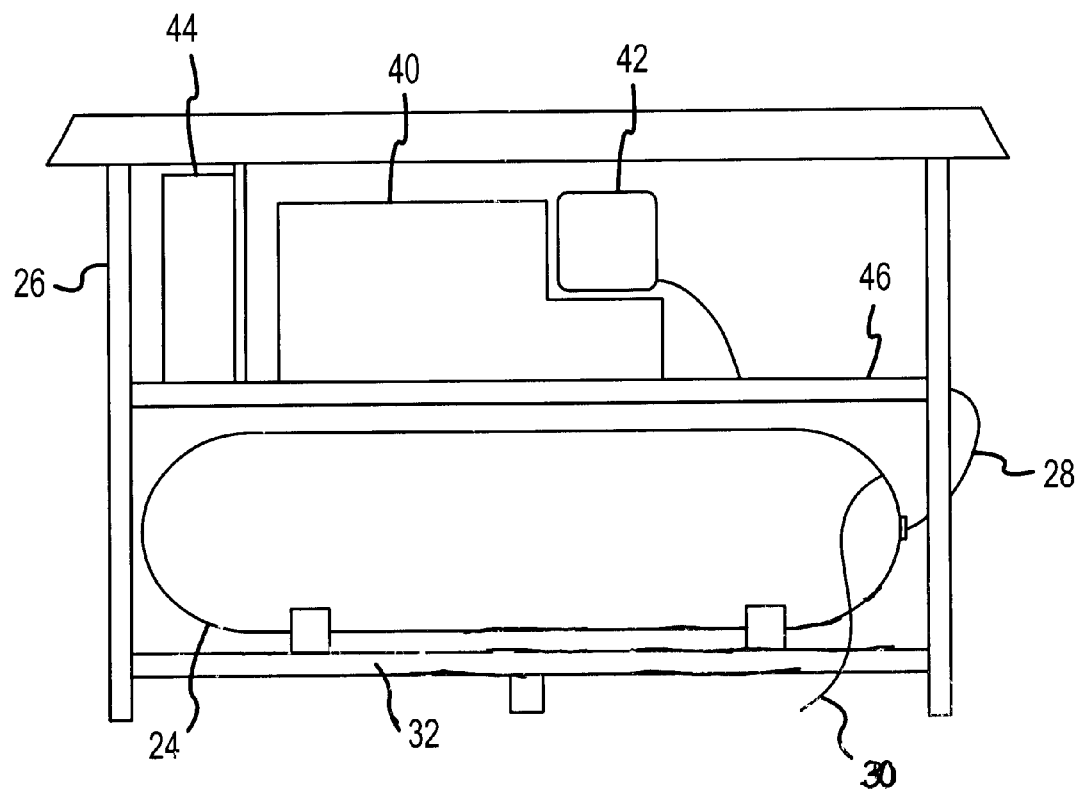
FIG. 3 is a side view of the backup generator cabinet including a view of the backup generator and the self contained fuel source.

Disclosed in FIG. 3 is a side view of the backup generator assembly with the environmental covers removed in order to reveal the backup generator and the backup generator control panel. As is seen, second level 46 supports both the backup generator 40 and the control panel 44. A small fuel tank 42 on the backup generator receives fuel from the propane tank 24 through fuel line 28. In one aspect to the invention the backup generator 40 is an internal combustion engine which runs on a combustible fuel source such as propane. A variety of companies provide these type of generators, these include the Generac II pre-packaged emergency power system, manufactured by the Generac Power System Company of Waukesha, Wis. The electricity generated by the backup generator is processed through the generator electronics 44. The electronics 44 include the functionality to convert the electricity from the generator into the proper voltage or amperage for use by the PCS site. Also included in the electronics are such things as sensors for detecting when a power outage occurs as well as various automated maintenance functions which will be described in greater detail below.

The purpose of this backup generator design is to provide multiple days of backup power to the PCS site during a power outage. This backup generator functions as a single, stacked, compact unit that is self maintaining and monitored remotely. Note that the length of backup power provided by the generator is based on the load of a PCS site (i.e., one-quarter load at 1.5 KW provides 92 hours and fully loaded cell at 6.0 KW provides for 43 hours of backup power based on Lucent's CDMA PCS mini cell). The fuel source 24 is sized so that it will fit within the cabinet and not take up any more space than necessary.

Due to space limitations in many PCS sites, driven by lease space costs, zoning limitations, and aesthetic values, the need for a single compact generator unit with multiple days of backup power is a much needed design. By sizing a propane tank into a custom made cabinet and stacking it under a generator, enables a single stack, compact unit to be achieved. Typically, fuel tanks are positioned remote from the generator cabinet which results in a large area to be required. This design eliminates the remote separation and thus reduces the space.

As was mentioned above certain automated functions may be incorporated into the backup generator system. These functions may include things like a periodic timer that activates the generator for routine maintenance. This capability eliminates the need for field support engineers to travel to the site to perform this function, saving manpower and time. Sensors may also be included for remote monitoring of the generator. These sensors may monitor things such as run/fail, fuel status and battery charge. These sensors may be included as part of a monitoring system which allows engineers to monitor the operation of the backup generator from a remote site. These monitoring capabilities also eliminate the need for field support engineers to travel to the site to perform this function.

Figure 4:
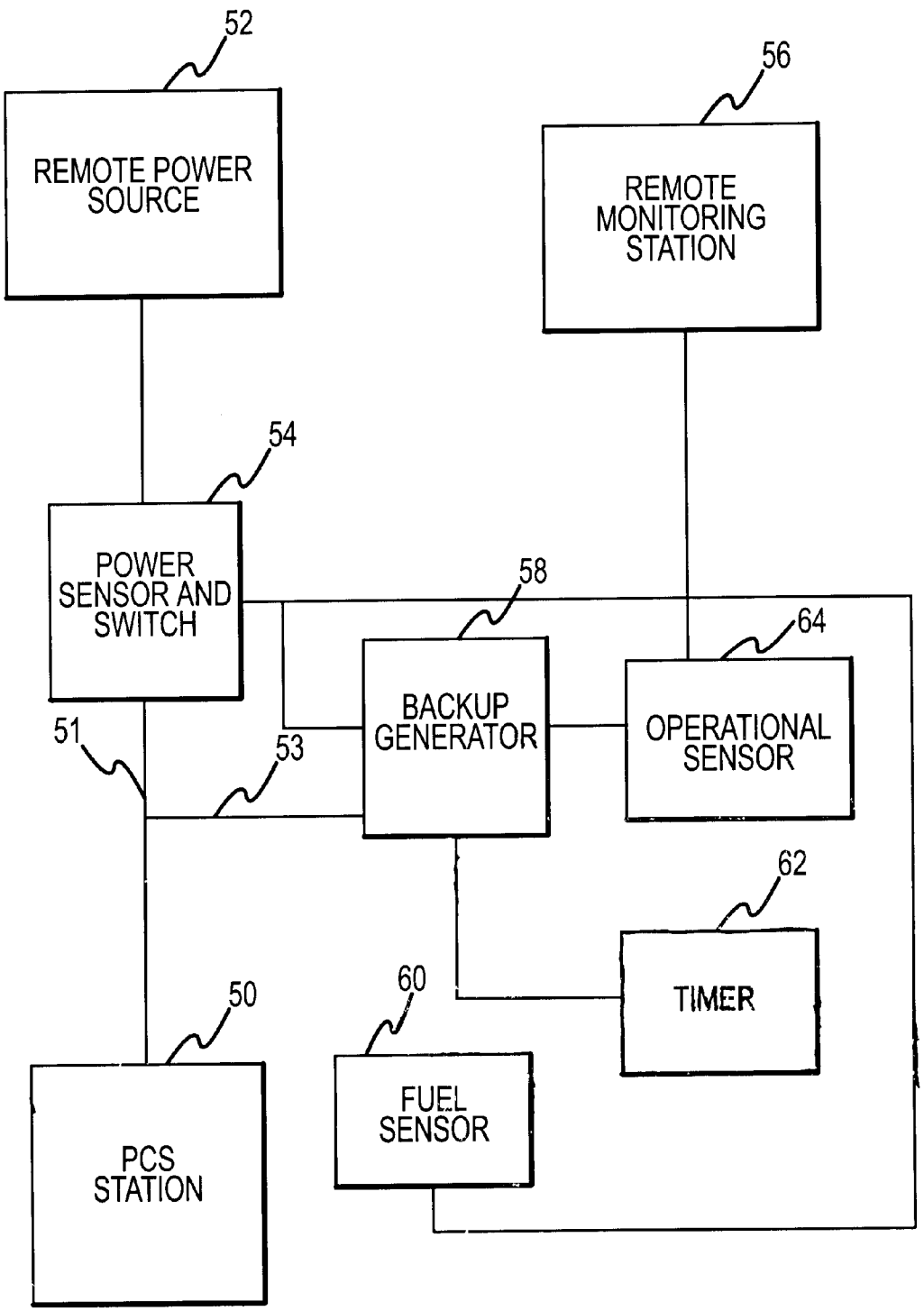
FIG. 4 is a system diagram for the electronic components for the backup generator system.

Disclosed in FIG. 4 is a system diagram which shows the electrical connections between the PCS station 30 the remote power source and the backup generator 58. As was previously described before, the PCS station 50 runs off of a primary power source 52 such as the power grid for a local community. In the eventuality that power from the grid is temporarily stopped, the backup generator 58 provides electrical power to the PCS station. In order to activate the backup generator, a power outage must first be detected. The power sensor and switch 54 is directly connected to the primary power source and detects when a power failure has occurred. This is a simple two mode device which changes mode when the power fails, and in turn activates the backup generator. The backup generator is directly connected into the primary power line 51 through line through 53. During the entire time that the power is out, the backup generator provides electricity to the PCS station. When power is restored from the remote power source, power sensor and switch 54 again change modes which will deactivate the backup generator.

In order to ensure that the backup generator is operating during the required times, an operational sensor 64 is included as part of the system. This operational sensor is connected to the backup generator and provides feedback to remote monitoring station 56. This operational center may be a headquarters of sorts for the particular phone company which runs the PCS site and from here they may monitor many different PCS sites or it may be any remote monitoring station. This operational sensor 64 may be simple enough that it merely detects the on or off condition of the backup generator, or it may be sophisticated enough to monitor the level of performance of the generator. Also connected back to the operational center is the fuel sensor 60. In one aspect of the invention, the fuel sensor merely detects that the level of fuel has dropped below a predetermined level. In this case the sensor is a simple on/off switch with a capacitive sensor in the fuel which conducts when immersed in the fuel, and is nonconducting when not immersed. It is also conceivable that a more sophisticated fuel sensor may be employed to actually measure the fuel level in the tank.

In order reduce the amount of maintenance and visits required to the PCS site by engineers, certain automated functions may be included in the backup generator system. One automated function in particular is the timer 62 which activates the backup generator on a periodic basis for routine maintenance. When the generator is activated, its operation can be monitored remotely. Through this monitoring it can be determined whether the generator is operating within normal parameters. This automated timer may be programmed remotely from the operations center. It is conceivable that other sensors may be employed to monitor battery levels, operating temperatures, and other levels relative to the operation of the generator. All these sensors would fall within the scope of the invention described herein.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A backup generator apparatus for providing electrical energy to a remote location comprising:
   a cabinet apparatus configured with environmental shutters so to enclose an interior space;
   a generator positioned in the interior space of the cabinet, where said generator is configured to be electrically connectable to at least one electronic apparatus;
   a self contained fuel source positioned in the interior space of the cabinet and connected to the generator through at least one fuel line; and
   monitoring apparatus in electrical connection with the generator, which is configured to monitor a power supply from a primary power source to the at least one electronic apparatus and to automatically activate the generator upon detecting of an outage of the power supply form the primary power sourced and deactivate the generator upon resumption of the primary power supply from the primary power source.

2. The compact generator of claim 1 wherein the generator provides power for personal communications system (PCS) ground station.

3. The compact generator of claim 2 wherein the self contained fuel source is located directly underneath the electrical generator.

4. The compact generator of claim 1 wherein the self contained fuel source is a propane tank and the electrical generator is an internal combustion engine.

5. The compact generator of claim 1 wherein the monitoring apparatus further includes sensors to monitor the amount of fuel in the self contained fuel source.

6. The compact generator of claim 1 wherein the monitoring apparatus further includes sensors to monitor the operational status of the electrical generator.

7. The compact generator of claim 1 wherein the monitoring apparatus monitors energy provided to a remote device, wherein the generator is automatically activated upon detection of a cut in power and deactivated when the power is resumed.

8. The compact generator of claim 1 further including an automatic timer which activates the generator at predetermined intervals for a predetermined amount of time.

9. The compact generator wherein claim 5 the fuel sensor is a simple electrical circuit that is activated to an "on" status when the fuel is below a predetermined level.

10. A back up power supply apparatus for a cell/pcs site comprising:
    a self contained generator including fuel supply positioned on the cell/pcs site configured to supply electrical energy to operate the the cell/pcs site upon activation; and
    an automated electronics apparatus electrically connected to the generator and a remote monitoring station which is configured to monitor a primary power source from a primary power supply and upon detection of an outage of the primary power from the primary power source automatically activate the generator, automatically deactivate the generator upon detection of resumption of the primary power supply form the primary power source and provide to the remote monitoring station status information regarding the generator and the fuel supply.

11. The compact generator of claim 9 wherein the self contained generator is mounted within a weatherproof cabinet.

12. The compact generator of claim 11 wherein a tank which provides fuel to the generator for an extended period of time is mounted in the cabinet.

13. The compact generator of claim 12 wherein the generator is positioned directly above the fuel tank in the cabinet.

14. The compact generator of claim 10 wherein the generator provides power for personal communications system (PCS) ground station.

15. The compact generator of claim 12 wherein the tank holds propane and the generator is an internal combustion engine.

16. The compact generator of claim 10 wherein the monitoring apparatus monitors the amount of fuel in the self contained fuel source.

17. The compact generator of claim 10 wherein the monitoring apparatus monitors the operational status of the electrical generator.

18. The compact generator of claim 10 wherein the monitoring apparatus monitors energy provided to a remote device, wherein the generator is automatically activated upon detection of a cut in power and deactivated when the power is resumed.

19. The compact generator of claim 10 further including an automatic timer which activates the generator at predetermined intervals for a predetermined amount of time.

20. The compact generator of claim 10 wherein the fuel sensor is a simple electrical circuit that is activated to an "on" status when the fuel is below a predetermined level.

* * * * *